United States Patent
Schwab et al.

(10) Patent No.: US 7,311,513 B2
(45) Date of Patent: Dec. 25, 2007

(54) INSTALLATION FOR PRODUCING OBJECTS BY THERMOFORMING PELLETS OF THERMOPLASTIC MATERIAL

(75) Inventors: Dominique Schwab, Versailles (FR); Timothy Cooper, L'Haye les Roses (FR)

(73) Assignee: Erca Formseal, Les Ulis (FR)

( * ) Notice: Subject to any disclaimer, the term of this patent is extended or adjusted under 35 U.S.C. 154(b) by 314 days.

(21) Appl. No.: 10/520,644

(22) PCT Filed: Jul. 9, 2003

(86) PCT No.: PCT/FR03/02150

§ 371 (c)(1),
(2), (4) Date: Aug. 4, 2005

(87) PCT Pub. No.: WO2004/007177

PCT Pub. Date: Jan. 22, 2004

(65) Prior Publication Data

US 2006/0127525 A1    Jun. 15, 2006

(30) Foreign Application Priority Data

Jul. 9, 2002   (FR) .................................. 02 08623

(51) Int. Cl.
*B28B 21/36* (2006.01)
(52) U.S. Cl. .............. 425/387.1; 425/528; 425/529; 425/534; 425/398; 264/549; 264/550; 53/453; 53/561; 53/282; 198/867.11; 198/803.14
(58) Field of Classification Search .............. 425/528, 425/529, 534, 387.1, 398, 397, 400; 53/559, 53/561, 282; 264/549, 550; 198/867.11, 198/867.12, 867.13, 803.15, 803.14

See application file for complete search history.

(56) References Cited

U.S. PATENT DOCUMENTS

| | | | |
|---|---|---|---|
| 3,964,237 A | 6/1976 | Johansen | 53/141 |
| 4,048,781 A * | 9/1977 | Johansen | 53/453 |
| 4,404,162 A | 9/1983 | Miki et al. | 264/514 |
| 6,094,890 A | 8/2000 | Michellon et al. | 53/453 |
| 2002/0079617 A1* | 6/2002 | Kageyama et al. | 264/322 |

FOREIGN PATENT DOCUMENTS

| | | |
|---|---|---|
| EP | 0 972 627 A2 | 3/1999 |
| EP | 1 066 950 A1 | 7/2000 |
| FR | 2 766 123 | 7/1997 |
| WO | WO 01/81069 A1 | 11/2001 |

* cited by examiner

*Primary Examiner*—Robert Davis
*Assistant Examiner*—Maria Veronica Ewald
(74) *Attorney, Agent, or Firm*—Sutherland Asbill & Brennen LLP

(57) ABSTRACT

The installation for manufacturing objects such as receptacles by thermoforming pellets of thermoplastic material includes conveyor means for conveying the pellets through the various stations in the installation, said stations including a heating station and a thermoforming station. The conveyor means comprise conveyor elements (46) defining cells (48) which are open upwards and downwards, and each of which is suitable for containing one pellet (12) while the entire top and bottom faces of the pellet remain unobstructed, means for depositing the pellets in the cells, drive means for driving the conveyor elements through the heating station, and transfer means (20) for transferring the heated pellets to the thermoforming station. The heating station includes bottom heater means (52) that co-operate with a support for the pellets while said conveyor elements are being driven through the heating station.

31 Claims, 7 Drawing Sheets

INSTALLATION FOR PRODUCING OBJECTS BY THERMOFORMING PELLETS OF THERMOPLASTIC MATERIAL

TECHNICAL FIELD

The present invention relates to an installation for manufacturing objects such as receptacles by thermoforming pellets of thermoplastic material, said installation including conveyor means for conveying the pellets through the various stations in the installation, said stations including a heating station for heating said pellets, which station includes bottom heater means and top heater means, and a thermoforming station for plastically deforming the heated pellets by stretching them.

BACKGROUND OF THE INVENTION

An installation of that type is known from French Patent No. 2 766 123 which explains the advantages related to using pellets of thermoplastic material rather than a continuous strip for thermoforming objects such as receptacles, those advantages relating in particular to the fact that wastage is avoided or considerably reduced.

It is even possible to make provision for the edges of the pellets to define the edges of the thermoformed objects, without it being necessary, after thermoforming, to perform any additional operation for rectifying said edges.

However, that generally requires the edges of the pellets to be deformed either after the thermoforming operations or during said operations. In order to achieve such deformation satisfactorily, it is desirable for the entire surface of each of the pellets to be heated to the thermoforming temperature in the heating station.

Unfortunately, in FR 2 766 123, the pellets are carried through the heating station by supports having rims on which the edges of the pellets rest. As a result, the zones of the pellets that are supported by the rims cannot be heated correctly, at least as regards the heating performed by the bottom heater means.

An object of the invention is to improve that state of the art further by making it possible to heat the pellets better.

SUMMARY OF THE INVENTION

This object is achieved by the fact that the conveyor means comprise conveyor elements defining cells which are open upwards and downwards, and each of which is suitable for containing one pellet while the entire top and bottom faces of the pellet remain unobstructed, means for depositing the pellets in the cells, drive means for driving the conveyor elements through the heating station between the bottom heater means and the top heater means, and transfer means for transferring the heated pellets to the thermoforming station, and by the fact that the bottom heater means co-operate with a support for the pellets while said conveyor elements are being driven through the heating station.

As explained below, the support may, for example, be constituted directly by a bottom heater plate, or else it may be constituted by a belt which is made of a heat-conducting material and which transmits the heat generated by the bottom heater means to the pellets while being driven in a manner such as to be synchronized with the conveyor elements. In either case, the support is in thermal contact with the bottom heater means, via heat transfer, or because it is constituted by the surface of a heater plate.

The top and bottom faces of the pellets are entirely unobstructed when the pellets are disposed in the cells, thereby making it possible for the entire bottom face to be exposed to the bottom heater means and for the entire top face to be exposed to the top heater means. The heater means may be constituted by a heater plate, or else by radiating heater means.

By being driven through the heating station, the conveyor elements push or pull the pellets with them so that they are also driven through said station, inside which the support for the pellets transmits the heat generated by the bottom heater means to said pellets. As a result, the heating of the pellets is of extremely good quality. In addition, the bottom faces of the pellets can rest on the surface of the support not only while the pellets are stopped in said installation, but also while said pellets are advancing through one step, the drive generally being stepwise.

In a first embodiment, the bottom heater means comprise a bottom heater plate, and said plate constitutes a support for the pellets while the conveyor elements are being driven through the heating station.

Advantageously, the installation includes a cold support plate which is disposed on one side of the bottom heater plate, and whose surface extends in the same horizontal plane as the surface of said heater plate, the bottom heater plate and the cold support plate being mounted to move sideways between a first position in which the bottom heater plate is suitable for supporting the pellets and a second position in which the cold support plate is suitable for supporting the pellets.

When the installation is in operation, with the heater means having been brought up to temperature, it can be necessary to stop it momentarily in order to remove defective pellets or else to reload the inlet of the machine with pellets. Depending on the time for which the installation is stopped, it can be desirable to prevent the pellets present in the heating station from remaining in contact with the bottom heater plate that might heat them excessively and damage them. By means of the above-mentioned provisions, it suffices, during a stop stage, to move the bottom heater plate and the cold support plate sideways so that the pellets are supported by said support plate.

When the top heater means are radiating heater means, it can suffice, during a stop stage, to stop powering the heater means so that they cease to heat the pellets.

However, advantageously, said top heater means are also suitable for being moved sideways with the bottom heater plate and the cold support plate so as to avoid exposing the pellets to said top heater means while the installation is at a stop.

Advantageously, the installation includes a cold top plate which is disposed above the cold support plate, and said cold top plate, and the top heater means are mounted to move sideways between a first position in which the top heater means are situated above the pellets and a second position in which the cold top plate is situated above the pellets.

The cold top plate makes it possible, when the pellets are between the two cold plates while the installation is at a stop, not only to prevent the temperature of said pellets from rising, but also to protect them against any dust.

The cold plates may be made of an insulating material so as to prevent the heat generated by the heater means from diffusing through said plates. They can optionally be refrigerated.

Advantageously, the top heater means comprise a top heater plate that presents a bottom surface suitable for being in contact with the top faces of the pellets.

This contact facilitates heating of the pellets, whose two faces are entirely uncovered by the conveyor means, and are in contact with the bottom and the top heater means. The top heater plate may present projecting heater surfaces which, during a heating stage, penetrate into the cells of the conveyor elements so as to come into contact with the top faces of the pellets.

However, it is advantageous for said top heater plate to be provided with a bottom surface that is plane, and for provision to be made for the top faces to stand proud (i.e. to project beyond) the conveyor elements. The top heater plate may be movable vertically so as to move away form the pellets during a drive stage.

In a second embodiment, the installation includes a bottom belt made of a heat-conducting material, and means for transmitting the heat generated by the bottom heater means to said belt. The bottom belt constitutes the support for the pellets which rest on the top surface of said belt. The bottom belt is driven through the heating station in a manner synchronized with the conveyor elements.

Advantageously, the installation includes a top belt made of a heat-conducting material, and means for transmitting the heat generated by the top heater means to said belt. The bottom surface of said belt is suitable for being in contact with the top faces of the pellets, and, in addition, the top belt is driven through the heating station in a manner such that it is synchronized with the conveyor elements.

Advantageously, the conveyor elements are constituted by conveyor slats.

Said slats advantageously present a thickness at the most substantially equal to the thickness presented by the pellets before they are thermoformed.

Said slats may be spaced slightly apart from the bottom heater plate (for example, it suffices for the spacing to be a few tenths of a millimeter), and also spaced apart slightly from the surface of the top heater plate during a heating stage.

For example, with the installation being organized to operate with pellets of a given thickness, the thickness of the conveyor slats is smaller than said given thickness by a value lying the range a few tenths of a millimeter to 1 to 2 millimeters.

Advantageously, each cell is defined between an upstream conveyor slat and a downstream conveyor slat disposed in succession in the direction in which the pellets are conveyed.

Thus, advantageously, the outline of each conveyor slat is provided with a downstream concave edge and with an upstream concave edge that are mutually aligned in the conveying direction in which the pellets are conveyed, the downstream concave edge of a first slat being suitable for defining a cell with the upstream concave edge of a second slat disposed downstream from said first slat.

This facilitates disposing the pellets in the cells since a pellet can be disposed between the facing concave edges of two slats, before said slats are disposed one against the other in order to close the cell formed by said two concave edges against the edge of the slat.

In another variant, each slat can be in the form of one piece provided with whole cells.

The invention will be better understood and its advantages will appear more clearly on reading the following detailed description of an embodiment shown by way of non-limiting example.

These and other features of the present invention will become apparent upon review of the following detailed description of the preferred embodiments when taken in conjunction with the appended claims.

BRIEF DESCRIPTION OF THE DRAWINGS

The description refers to the accompanying drawings, in which.

DETAILED DESCRIPTION OF THE INVENTION

Figure 1:
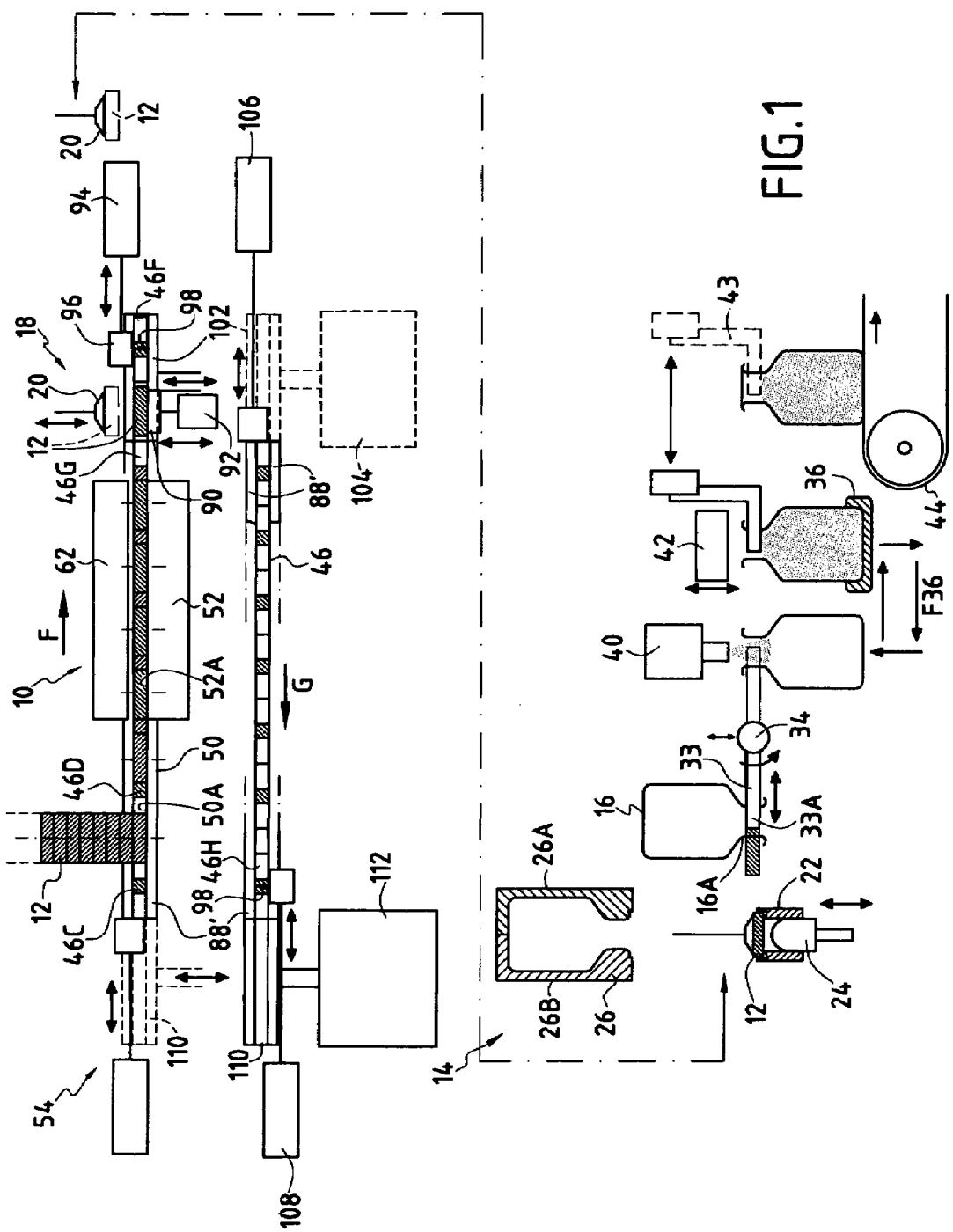
FIG. 1 is an overall view of an installation of the invention including a first embodiment of the heating station.

The installation shown in FIG. 1 includes a heating station 10 for heating pellets 12 of thermoplastic material, means for driving the pellets through the heating station to the outlet of said station, and a thermoforming station 14 in which the hot pellets are deformed plastically to form objects such as receptacles 16.

The hot pellets are transferred from the outlet of the heating station to the thermoforming station by transfer means 18. Said transfer means comprise pick-up means, e.g. a suction-cup arm 20 suitable for picking up the hot pellets using suction and substantially without cooling them, and for conveying the pellets to the thermoforming station. For example, the suction-cup arm is controlled in a cycle comprising a vertical movement for picking up the pellets and for raising them using suction, then a horizontal movement on a carriage until the suction-cup arm comes above the bottom tool 22 of the thermoforming station 14, following by lowering inside said station, and interrupting the suction so that the pellet is disposed on the bottom tool 22, and then return to the starting position.

In this example, said bottom tool 22 is a thermoforming countermold that movably receives a thermoforming piston 24 which, when the thermoforming mold 26 is closed against the countermold, moves in translation to deform the pellet 12 and to bring the material thereof into the chamber in the mold 26, the pellet being pressed against the wall of said mold by air injection. In the example shown, the receptacles are thermoformed upwards, the mold being the top tool of the thermoforming station. In addition, in the example shown, each of the thermoformed receptacles is provided with a neck 16A which forms an undercut, and the mold 26 is made up of a plurality of portions 26A and 26B that can be moved apart for unmolding purposes.

At the outlet of the thermoforming station, the receptacle that has just been thermoformed is picked up by means of tongs 33A. For example, said tongs equip the free end of a retractable arm 33 which is deployed in order to pick up the receptacle in the thermoforming station, and which is retracted in order to move it away therefrom.

The arm 33 is mounted on a pivotally mounted support 34, thereby making it possible to turn the receptacle the right way up so that its neck is disposed upwards after it is moved away from the thermoforming station. The righted receptacle, still carried by the arm 33, is disposed in the filling station 40. It can be taken up by a bottom support 36 which is movable along the sides of a rectangle as indicated by arrows F36 so as to be placed under the filled receptacle, so as to support said filled receptacle, and so as to bring it by moving it horizontally into a station 42 for fitting and sealing a lid or a cap. At the outlet of this station, the receptacle is taken up by another arm 43 equipped with tongs, which arm places it on the final conveyor enabling it to be removed from the installation and to be packaged.

Figure 3:
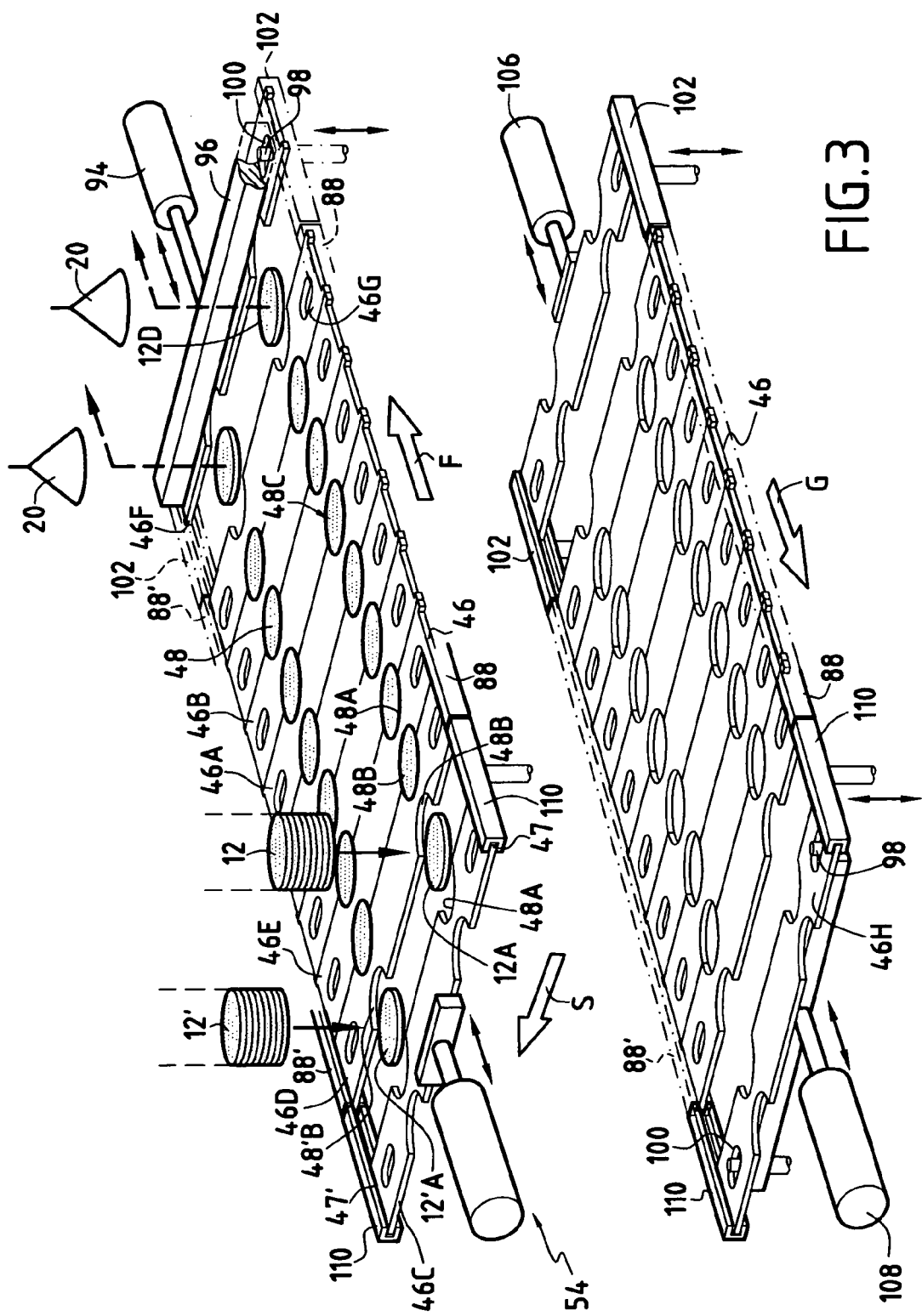
FIG. 3 shows how the conveyor slats move in the installation.
Figure 4:
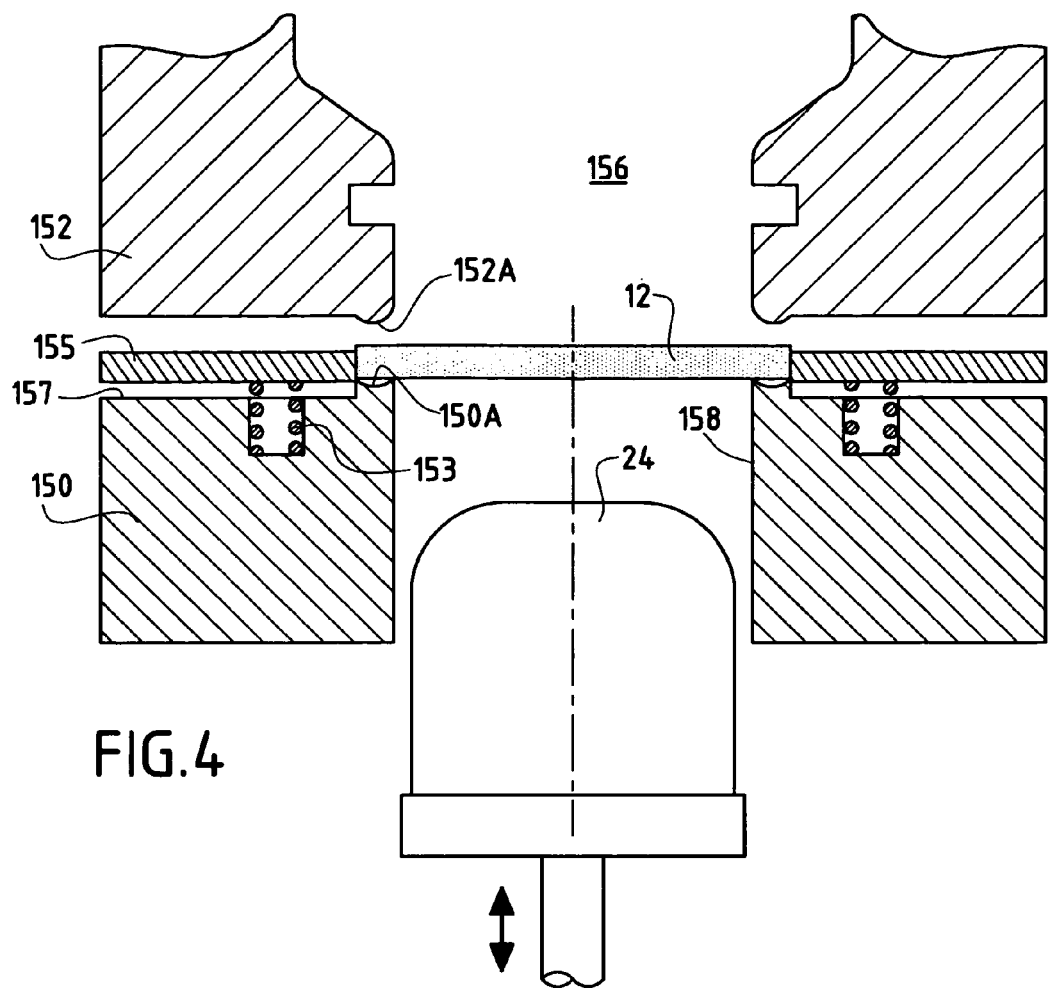
FIGS. 4 and 5 are diagrammatic vertical section views in the thermoforming station.
Figure 5:
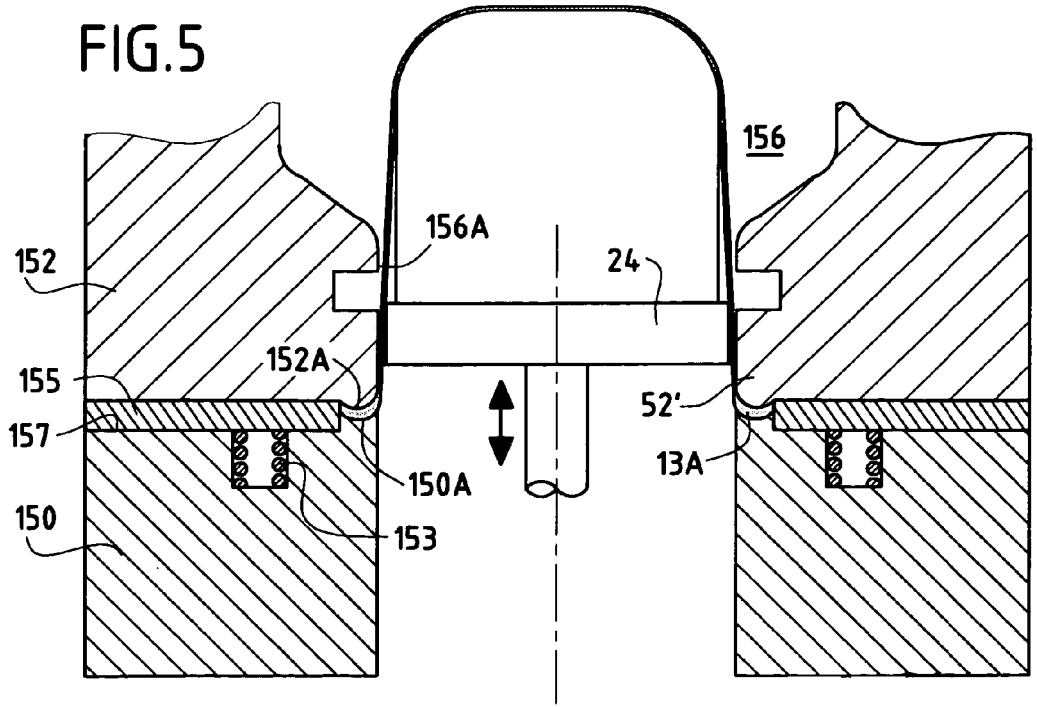

As can be better understood from FIG. 3, the conveyor means comprise conveyor elements constituted by conveyor slats 46 which define cells 8 that are totally open both upwards and downwards. One pellet 12 can be disposed in each cell, without being retained either upwards or downwards. In order to make the drawings clearer, the conveyor slats in FIG. 1 are shown in section in the plane that contains the cell diameter that is parallel to the direction of advance F.

In this example, each cell, such as the cell 48C, is defined between an upstream conveyor slat 46A and a downstream conveyor slat 46B that are disposed in succession in the direction F in which the pellets are conveyed. More precisely, it can be seen that each conveyor slat presents at least one downstream concave edge 48A and at least one upstream concave edge 48B, respectively disposed on the downstream side and on the upstream side of the slat in the direction F.

It can be seen that, when two successive slats are disposed such that the downstream side of the upstream slat is touching the upstream side of the downstream slat, the downstream concave edge of the upstream slat and the upstream concave edge of the downstream slat are disposed facing each other so as together to define a closed cell in which a pellet 12 can be disposed.

Said edges then form a continuous boundary for said cell, e.g. in the form of a circle.

In the example shown, the installation makes it possible to thermoform two receptacles in each thermoforming step. That is why it works from two stacks of disks 12 and 12' disposed side by side in the transverse direction S of the installation.

Naturally, it could also work from more than two stacks of disks so as to thermoform receptacles over more than two rows, or indeed work from a single stack.

In the description below, operation of the installation is described with reference to the elements thereof that act on the disks in one of such stacks.

Thus, FIG. 1 shows that the installation includes an inlet table 50 whose surface 50A extends in the same horizontal plane as the surface 52A of the bottom heater plate 52.

The conveyor means comprise means for bringing a conveyor slat onto the inlet table into a waiting position in which the downstream concave edge of said slat is facing the stack. The slat 46C of FIGS. 1 and 3 is in said waiting position. The conveyor means further comprise means for moving said slat downstream, in the direction F, so that the downstream concave edge 48A of said slat co-operates with the bottom pellet 12 in the stack so as to drive said pellet downstream, at least until said slat reaches an intermediate position in which the upstream concave edge of said slat is in front of the stack.

In FIG. 3, slat 46D is in said intermediate position. At the preceding step, it was in the position occupied by slat 46C and it has been moved so that its downstream side comes against the upstream side of the slat 46E disposed immediately downstream from it. Similarly, it can be understood that the slat 46C can be moved so as to take up the bottom pellets 12A and 12'A of the two stacks via its two downstream concave edges 48A and 48'A, before pushing said pellets against the upstream concave edges 48B and 48'B of the slat 46D. When said slat 46C has reached its intermediate position, other pellets can come into contact with the inlet table, and another slat can take up the waiting position.

The drive means advantageously comprise a drive member that is movable in reciprocating manner between a first position in which it is suitable for co-operating with a slat in the waiting position, and a second position in which it places said slat into its intermediate position. In the example shown, said drive member is constituted by an actuator 54 which, when a slat is on the inlet table, in its waiting position, can push it until it takes up its intermediate position, and can then retract so as to wait for another slat to come into its waiting position. When a slat reaches its intermediate position, it pushes the slats disposed in front of it downstream. In this way, the pellets contained in the cells defined between the slats are conveyed stepwise through the installation.

Figure 2:
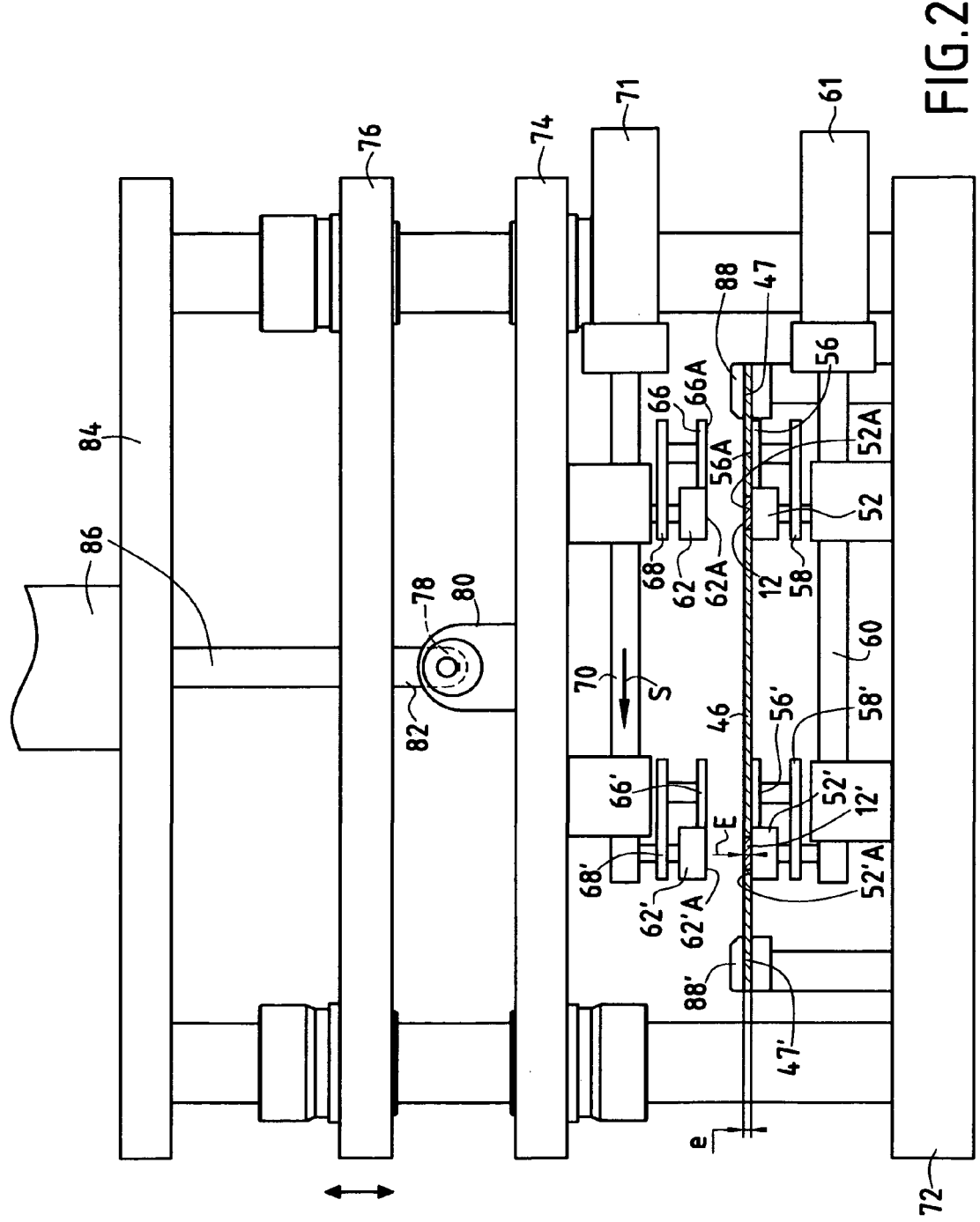
FIG. 2 is a cross-section view of FIG. 1, showing the heating station.

The pellets contained in the cells defined between the slats are supported by the inlet table 50 until they reach the heating station 10. Whereupon, the pellets are supported by the surface of the heater plate 52. FIG. 2 shows a slat 46 and two pellets 12, 12' disposed on the top faces 52A and 52'A of respective ones of the two bottom heater plates 52 and 52'.

The heater tools enable pellets coming from both stacks to be heated simultaneously. For reasons of simplicity, only those heater tools which are situated on the right of FIG. 2 are described below, the tools of the left being identical and being designated by like references with the prime sign "'".

It can thus be seen that the installation includes a cold support plate 56 which is disposed on one side of the bottom heater plate 52. Its top surface 56A extends in the same horizontal plane as the top surface 52A of said heater plate. In FIG. 2, the bottom heater plate 52 and the cold support plate 56 are in their first position in which the bottom heater plate is supporting the pellet 12. When the installation stops, they can be moved together sideways in the direction S that is transverse to the direction F, so as to take up a second position in which it is the support plate 56 that supports the pellet 12.

In the example shown, the plates 52 and 56 are carried by the same bottom deck 58 relative to which their positions can be adjusted so that their surfaces 52A and 56A are strictly in alignment with each other. The deck is mounted on a carriage 60 which can be moved in reciprocating manner by an actuator 61, so that the plates 52 and 56 can take up the above-mentioned first and second positions.

The plates 52' and 56' are mounted on a deck 58' which is carried by the same carriage 60.

Similarly, the heater tools on the right of FIG. 2 comprise a top heater plate 62 and a top cold plate 66 which is disposed above the cold support plate 56. The plates 62 and 66 can be moved sideways in the direction S between a first position (shown in FIG. 2) in which the top heater plate 62 is disposed above a pellet 12, and a second position in which the top cold plate is situated above said pellet.

The plates 62 and 66 are supported by a common top deck 68 which is itself carried by a carriage 70 which also carries the deck 68' that supports the top heater plate 62' and the top cold plate 66' of the left heater tools in FIG. 2. The carriage 70 can be moved in reciprocating manner by an actuator 71.

The bottom carriage 60 is carried by a base 72, while the top carriage 70 is carried by a carrier plate or beam 74. Said plate or beam is itself supported relative to a reference support plate or beam 76 relative to which it can be moved to a small extent vertically. Such movement can be achieved by driving an eccentric shaft 78 in rotation (e.g. by means of a rotary actuator (not shown)) whose eccentric is carried by a bearing 80 that is secured to the plate 74, and whose portion that is circularly symmetrical about its axis of rotation is carried by a bearing 82 that is secured to the plate 76. This vertical movement of the plate 74 makes it possible to move the top heater plate(s) vertically. They can thus be moved apart to a small extent from the top faces of the pellets while said pellets are being advanced through one step, and then be moved downwards so that their bottom surfaces 62A and 62'A come into contact with the top faces of the pellets. Naturally, the top cold plates are moved at the same time.

The reference support plate 76 is itself supported by a stationary plate 84 and by an actuator 86, and it can be moved vertically so as to move the top heater plates away from the bottom heater plates to a large extent for the purpose of performing maintenance on the machine.

The bottom surface 66A of the top cold plate can be disposed in the same horizontal plane as the bottom surface 62A of the top heater plate.

In order to make the drawing clearer, the plates 62 and 66 appear to be some distance away from the pellet 12 in FIG. 2. In reality, during heating, the bottom surface 62A of the plate 62 is in contact with said pellet, and it is spaced apart therefrom to a small extent while the pellets are advancing. The bottom surface 66A of the plate 66 can be in contact with the pellet or else spaced apart therefrom to a small extent while the installation is stopped.

The thickness e of a conveyor slat 46 is advantageously slightly less than the thickness E of a pellet prior to thermoforming. This makes it possible to ensure that both faces of each pellet touch the facing surfaces of the heater plates, without the slats touching said surfaces.

As can be seen in FIG. 2, the installation includes longitudinal rails 88 and 88' which are suitable for co-operating with the side ends 47 and 47' of the slats while said slats are being driven.

Advantageously, said rails are suitable for supporting the slats while maintaining them out of contact with the heater plates. Since the bottom heating plates are stationary, the rails are adjusted so that they support the plates so that the bottom faces thereof are very slightly above the surfaces of the bottom heater plates, e.g. at a distance of about a few a tenths of a millimeter. The difference in thickness between the slats and the pellets also makes it possible to ensure that, even when the top heater plate is in the low position, the slats are not in contact with the bottom surface of said plate.

The rails extend over the entire length of the path along which the slats travel from the inlet table to the outlet of the heater station.

For example, the slats can be made of metal or of a composite material, and they are sufficiently rigid to be capable of being supported via their side ends only.

In FIGS. 1 and 3, reference 46F designates the slat that is the last one, i.e. the one furthest downstream, along the path along which the pellets are conveyed. Said slat 46F is projecting slightly beyond the outlet of the heater station. The pellet 12D, which is about to be picked up by the pick-up means so that it can then be disposed in the thermoforming station, is situated between said slat 46F and the conveyor slat 46G that is immediately upstream therefrom.

The pick-up means, constituted, for example, by a suction cup 20, are ready to pick up the pellet 12 that is situated between said two slats. The installation includes means for moving the downstream conveyor slat 46F away from the upstream conveyor slat 46G before said member picks up said pellet. It can be seen that the slat 46F is separated from the slat 46G, i.e. that the cell that it forms with said slat for receiving the pellet 12 is opened up. At this time, the pellet 12 is supported by a support 90. Since the pellet 12 is heated, it can tend to adhere slightly to the concave edges of the slats. The operation consisting in moving the slat 46F away from the slat 46G tends to unstick said pellet 12 from the facing concave edges of said two slats, thereby making it easier for said pellet to be picked up by the pick-up means 20.

Advantageously, the installation includes means for vertically moving the pellet 12 that is situated between the slats 46F and 46G towards the pick-up member 20. For example, if, as shown in the drawings, the pick-up member 20 is situated above the pellets, the support 90 that is carrying the pellet 20 as it exits from the heater station can be the head of the piston of an actuator 92 which can be moved vertically over a very short stroke. After the slat 46F ahs been moved away, the piston can be moved vertically in order further to facilitate unsticking the pellet, and in order to make it easier for it to be picked up by the member 20.

In this example, the means that make it possible to move the slat 46F away from the slat 46G comprise a separating actuator 94 that takes hold of the slat 46F and moves it away from the slat 46G.

For example, the head of said actuator 94 is formed by a transverse bar 96 suitable for being placed above the slat 46F wile said slat is still disposed against the slat 46G and is still supported by the rails 88 and 88'. Said head 96 carries ratchets 98 that retract when it advances over the plate 46F and that are deployed naturally, by being urged out by springs, into bores 100 provided in the slat. When the head 96 moves in the direction indicated by the arrow F, the slat is thus driven with it.

The slat 46F is thus disposed on a support 102 that forms an elevator. In FIG. 1, said support is shown in uninterrupted lines in its high position, and in dashed lines in its low position.

The support 102 has two support portions formed by rail segments which, in its high position, come into alignment with respective ones of the above-mentioned top rails 88 and 88', and which, when said support is in its low position, come into alignment with respective ones of bottom rails 88 and 88' that are analogous to the top rails.

When the support 102 reaches its low position, the slat 46F whose bores 100 have naturally been released from the ratchets 98, can be pushed by the head of an actuator 106 in the direction G opposite from the direction F, so as to be engaged in the bottom rails 88 and 88'.

Thus, by successively pushing the slats 46 that are brought into the low position by the support 102, the actuator 106 causes the slats to advance stepwise over their return path along which they return in the direction G.

When a slat 46H comes to the end of its return path, under the inlet table 50, it can be separated from the other slats carried by the bottom rails 88 and 88' by an actuator 108 analogous to the actuator 94 and, like it, provided with ratchets 98. By actuating the actuator 108, said head can be caused to advance under the slat 46H, and its ratchets remain retracted until they reach the bores 100 into which they are urged resiliently. The head of the actuator 108 can then move back in the direction G while driving the slat 46H with it, said actuator then disposing said slat on the elevator-forming support 110 which is in its low position (in uninterrupted lines in FIG. 1) in which its two support portions formed by rail segments are in alignment with respective ones of the bottom rails 88 and 88', behind said bottom rails.

The support 110 can then rise into its high position (in dashed lines in FIG. 1) in which its support portions are facing the rear ends of the top rails 88 and 88'. The slat carried by said support 110 can then be pushed forwards onto the inlet table 50 by the head of the actuator 54.

It should be noted that the head of the actuator 108 passes between the support portions of the support 110 so that its ratchets take hold of the slat 46H by engaging in the bores therein.

In the example shown diagrammatically, the elevators 102 and 108 are carried by the moving portions of actuators 104 and 112. Naturally, other systems can be imagined for moving said elevators vertically. For example, they can both be connected to a common horizontal shaft via a system of links that, when said shaft rotates, simultaneously move both of the elevators, either in phase or in anti-phase.

Figure 8:
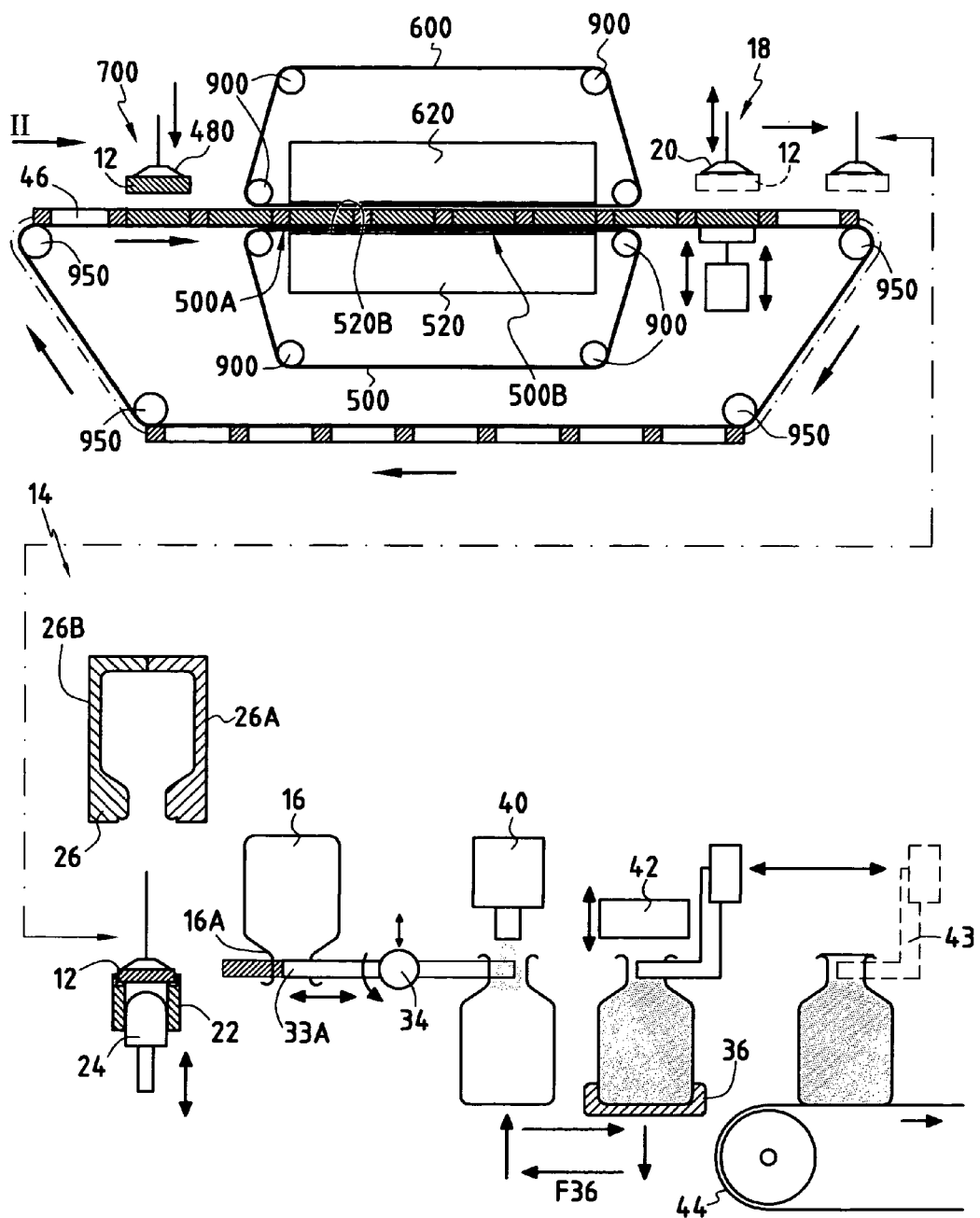
FIG. 8 is an overall view of an installation of the invention including a second embodiment of the heating station.
Figure 9:
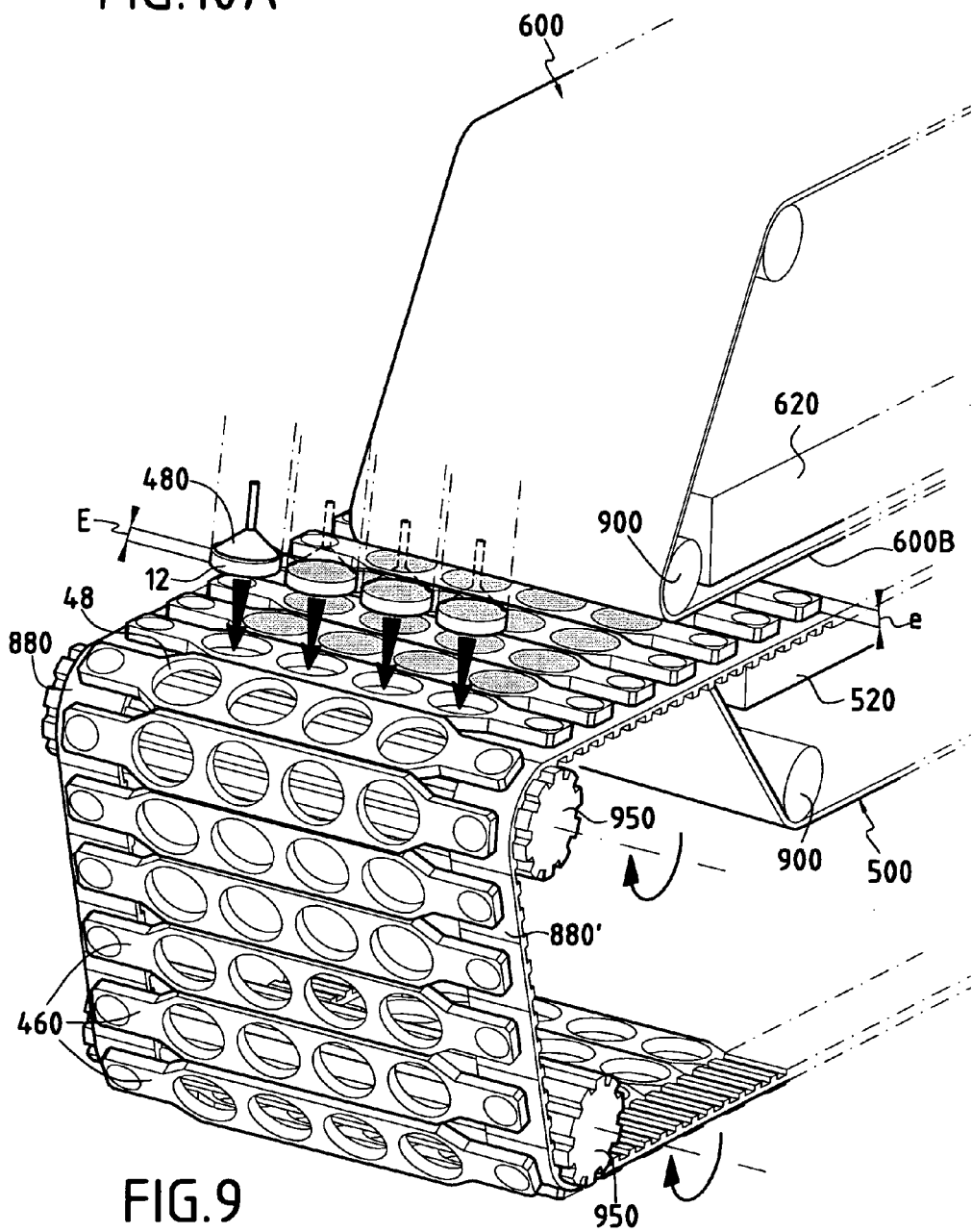
FIG. 9 is a diagrammatic perspective view of the upstream portion of the thermoforming station.

In a second embodiment shown in FIGS. 8 and 9, the installation includes a bottom belt 500 made of a heat-conducting material. As shown in FIG. 8, it is a conveyor belt formed of a loop whose top strand passes through the heating station. Its working surface, i.e. its drive top surface 500B lies substantially in the same plane as the bottom surfaces of the conveyor elements 460.

Thus, the pellets are supported in the heating station 10 by the top surface 500B of the bottom conveyor belt 500. A stepper motor (not shown herein) makes it possible to cause the belt to advance in a manner synchronized with the conveyor elements, i.e. the belt accompanies the pellets by advancing stepwise with them so that there is no relative movement between the pellets and the top surface of the belt. It can thus be understood that the bottom belt 500 constitutes a moving support for the pellets 12 while said pellets are passing through the heating station 10.

The heating system of the installation further includes bottom heater means 520 and means for transmitting the heat generated by the bottom heater means to the bottom conveyor belt 500. Thus, the bottom conveyor belt transmits to the pellets that are passing through the heating station the heat generated by the bottom heater means (which are, for example, formed by a conventional metal plate that contains heater resistors).

This bottom plate 520 is situated in the heating station below the drive surface of the bottom conveyor belt 500 so that the top surface 520B of the bottom heater plate is in thermal contact with the bottom surface 500A of the conveyor belt 500.

While the heating station is operating, the heat generated by the bottom heater plate 520 is thus transmitted by thermal contact firstly to the belt 500, and then from said belt to the pellets 12.

To this end, the belt 500 is made of a heat-conducting material and presents a thickness that is relatively small, e.g. in the approximate range 2 tenths of a millimeter to 10 tenths of a millimeter. It can thus be understood that the material of which the belt is made must have very good physical properties: resistance to traction and to thermal deformation, and very good heat conductivity while also being non-adhesive. In order to satisfy these requirements, an optionally reinforced composite material is used.

The installation advantageously includes a top belt 600 situated above the bottom belt 500 and circulating through the heating station, via the bottom run of the loop that it forms. This top conveyor belt is positioned such that its drive bottom surface 600A is parallel to the top surfaces of the pellets that are situated in the heating station 10.

As regards its structure, the conveyor belt 600 can be identical to the belt 500.

The bottom surface of the belt 600 is suitable for being in contact with the top surfaces of the pellets 12 that are passing through the heating station 10. During normal operation, the bottom surface 600A of the top belt presses slightly against the top surfaces of the pellets 12 so that substantially no gaps exist between the surface of the belt and the top surfaces of the pellets.

In the example shown, the heater means include a top heater plate 620 placed such that the bottom surface 620A of the said plate is in substantially gap-free contact with the top surface 600B of the top conveyor belt. Said contact makes it possible to guarantee heat conduction between the heater plate and the belt. The heat is then transmitted from the conveyor belt to the top surfaces of the pellets which are thus heated from their top surfaces.

In addition, the top conveyor belt is driven in a manner synchronized with the conveyor belts in the same way as the bottom conveyor belt. This synchronized drive is achieved by means of a stepper motor that is not shown in the figures.

It can thus be understood that the above-described conveyor belts have two functions: to accompany the pellets through the heating station by holding them, and to heat said pellets.

The path followed by the pellets through the heating station is described below.

Upstream from the heating station 10, the installation includes mans 700 for depositing the pellets in the cell locations defined by the conveyor elements 460. Said means are in the form of a pick-up mechanism equipped with a suction cup 480 which takes a pellet from a waiting stock and places it in a cell 48 of a conveyor element 460 when said element is situated on an inlet support (not shown in FIG. 9) such as an inlet table disposed between the cog belts described below upstream from the belt 500, or a portion of belt 500 that extends upstream from the belt 600. In this example, each conveyor element is a slat 460 that is provided with one or more cells, each of which serves to receive one pellet 12. This pellet-depositing operation is performed while the drive is stopped, and, in practice, one pellet is deposited almost simultaneously in each cell 48 of the slat to be loaded.

The loaded slat is then driven stepwise towards the heating station 10 by means of two belts 880, 880' fixed to the side ends of the slats 460 and turning in closed loops. For example, they are cog belts driven by suitable cog wheels 950. This can be seen clearly in FIG. 9 which shows the deposition upstream zone of the installation while the installation is stopped.

Advantageously, the conveyor slats 460 present a thickness (e) at the most substantially equal to the thickness (E) presented by the pellets before they are thermoformed, or preferably slightly less than said thickness (E). Thus, when a conveyor slat 460 containing pellets 12 arrives at the inlet of the heating station 10, the bottom and top surfaces of the pellets are progressively and simultaneously pressed between the bottom belt and the top belt. In practice, it is the heater plates that, in their operating position, press the pellets vertically via the belts. Means, e.g. actuators (not shown), are provided for making it possible to move the heater plates vertically.

In addition, if the heater means are formed by a plurality of spaced-apart elements (a plurality of heater plates), presser portions pushing the belts against the slats can be disposed between said elements. However, it can suffice for the deflector rollers 900 for deflecting the belts, in particular the deflector rollers that are situated downstream from the heating station, to apply such pressure.

The pellets are heated via the belts as they travel along their path through the heating station. The simultaneous action of the heat and of the pressure exerted by the belts ensures that the pellets are almost "riveted" into their cells.

Figure 10A:
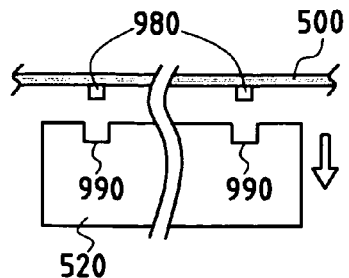
FIG. 10a is a diagrammatic view in a vertical plane of the bottom heater plate, of the support rods, and of the bottom belt while the installation is stopped.
Figure 10B:
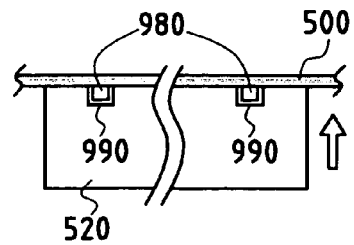
FIG. 10b is a diagrammatic view in a vertical plane of the bottom heater plate, of the support rods and of the bottom belt while the installation is operating.

While the machine is stopped, the heater plates 520, 620 can be moved vertically away from the belt in order to avoid overheating the pellets. Support rods 980 are disposed under the bottom belt 500 in order to keep it substantially horizontal when the bottom heater plate 520 is in the low position, as shown in FIG. 10*a*. On the top face, the bottom heater plate is provided with grooves 990 that can receive the rods 980 when the bottom heater plate 520 is in the high position as shown in FIG. 10*b*. It is preferable for said rods 980 to be relatively fine so as to avoid generating non-heated zones on the conveyor belt 500. For example, they are disposed longitudinally under the zones of the slats that are situated between the cells.

At the outlet of the heater station, the bottom and the top belts reach their deflector rollers 900 before the belts that drive the slats reach their return cog wheels 950.

Thus, the hot pellets contained in the conveyor slat that reaches the ends of the conveyor belts are simultaneously "peeled", i.e. the contact between the surface of the bottom belt and the bottom surfaces of the pellets is broken, and the contact between the surface of the top belt and the top surfaces of the pellets is broken;

The anti-adhesive properties of the material of which the belt is made make it possible for peeling to take place without damaging or deforming the hot pellets.

In addition, the above-mentioned "riveting" of the pellets in the cells in the slats makes it possible to guarantee that the pellets are carried by the slats in the zone situated between the heating station and the ejection station.

The transfer means 18 are analogous to the transfer means of FIG. 1, and they are in the downstream ejection position as can be seen in FIG. 8.

Advantageously, the installation includes a shaping device disposed downstream from the heating station and suitable for co-operating with the peripheries of the pellets 12 before they are thermoformed. As can be understood with reference to FIGS. 4 to 7, said shaping device is provided with a support edge 150A and with a shaping clamp 155 whose two arms, respectively 155A and 155B are suitable for being opened (FIG. 6) while a pellet 12 is being put in place on the support edge 150A, and for being closed again so as to define between them a shaping outline for the pellet.

More precisely, the support edge 150A forms a die-stamping edge of a die 150. In this example, the die 150 internally defines a cylinder 158 in which the thermoforming piston 24 can move vertically. The die is thus formed directly by the thermoforming countermold.

Prior to die-stamping, the pellet 12 is held on the die-stamping edge 150A by being wedged in the shaping outline defined between the arms 155A and 155B of the shaping clamp 155. Sometimes, the pellet can be slightly deformed due to it being conveyed through the heating station, and the opening of the arms, shown in FIG. 6, facilitates putting said pellet in place inside the shaping opening, in spite of any deformation. The shaping clamp is mounted on the die 150 on springs 153. In the free state, with the die stamp being spaced apart from the die, the shaping clamp is situated in its high position. As can be seen by comparing FIGS. 4 and 5, the die stamp 152 can be moved downwards to co-operate with the die-stamping edge 150A so as to die-stamp the peripheral region 13A of the pellet 12 while said peripheral region is held captive in the shaping device. The periphery of the pellet is held captive in the shaping outline defined by the arms of the clamp 155A and 155B. Under the effect of the die stamp 152 being moved downwards, the shaping clamp 155A is also pushed downwards against the top edge 157 of the setback in the die 150 in which said clamp is disposed. The setback is defined as being set back relative to the die-stamping edge 150A.

Figure 6:
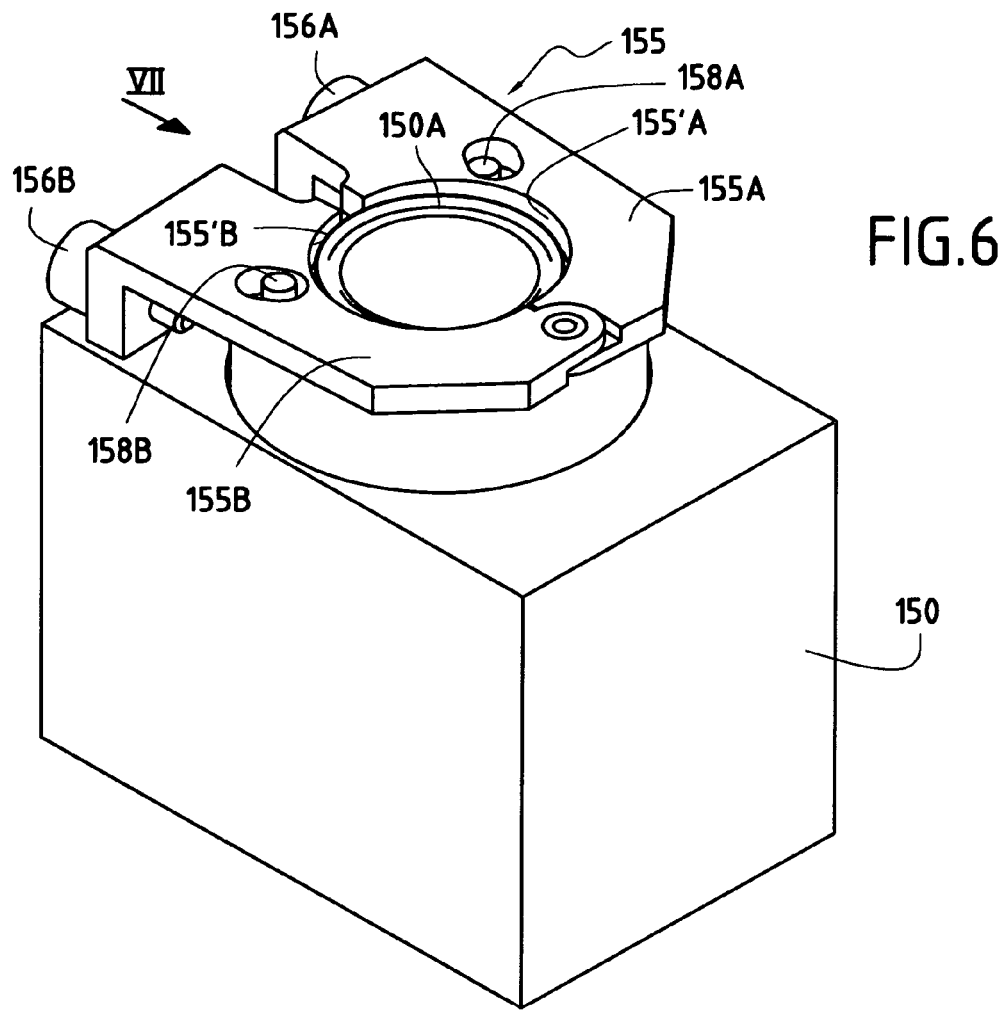
FIG. 6 is a diagrammatic perspective view of the bottom tool of the thermoforming station.
Figure 7:
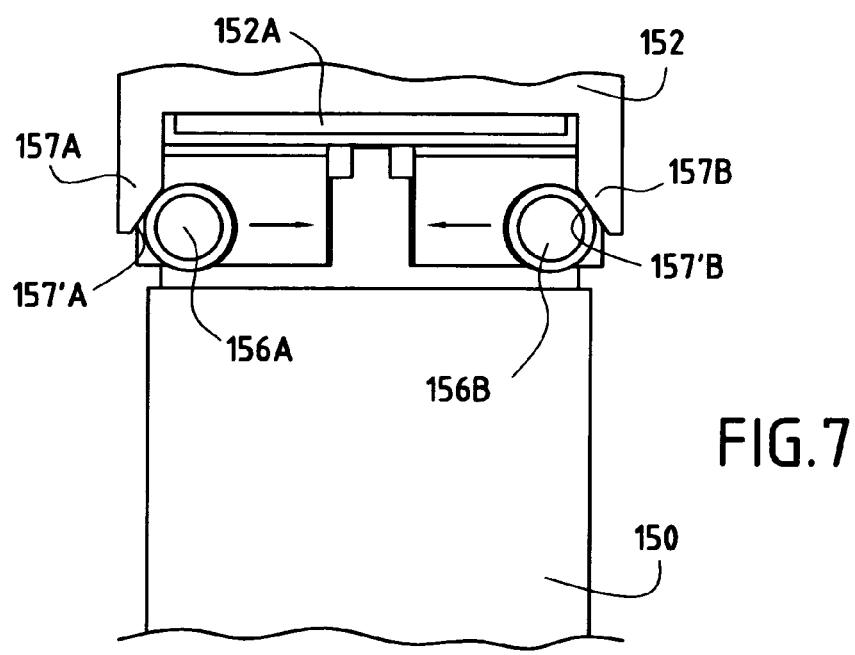
FIG. 7 is a view seen looking along arrow VII of FIG. 6.

It can be seen in FIGS. 6 and 7 that each of the two arms 155A and 155B of the clamp carries a cam wheel, respectively 156A and 156B. The die stamp 152, which, in this example, is defined by the bottom end of the thermoforming chamber, carries fingers, respectively 157A and 157B which are carried by the die stamp and which co-operate with said cam wheels via their ramps, respectively 157'A and 157'B, to close the arms of the clamp just before the die-stamping proper starts. The arms 155A and 155B are urged continuously into their spaced-apart position by resilient means (not shown), which position is limited by abutments, respectively 158A and 158B.

In FIGS. 6 and 7, the shaping device is disposed in the thermoforming station, and this corresponds to a preferred embodiment. Insofar as the receptacles are thermoformed upwards, the thermoforming die is constituted by the top portion of the countermold, while the die stamp is constituted by the bottom portion of the mold. Naturally, if the receptacles were thermoformed downwards, a reverse configuration would be used, the die and the die stamp being constituted respectively by the top edge of the mold and by the bottom edge of the countermold. In which case, the shaping clamp 155 would be carried by the mold.

It should be apparent that the foregoing relates only to the preferred embodiments of the present invention and that numerous changes and modifications may be made herein without departing from the spirit and scope of the invention as defined by the following claims and the equivalents thereof.

We claim:

1. An installation for manufacturing objects such as receptacles by thermoforming pellets of thermoplastic material having top and bottom faces, said installation including conveyor means for conveying the pellets through stations in the installation, including a heating station for heating said pellets, which station includes bottom heater means and top heater means, and a thermoforming station for plastically deforming the heated pellets by stretching said pellets, the conveyor means comprising conveyor elements defining cells which are open upwards and downwards, and each of which is suitable for containing one pellet while the entire top and bottom faces of the pellet remain unobstructed, means for depositing the pellets in the cells, drive means for driving the conveyor elements through the heating station between the bottom heater means and the top heater means, and transfer means for transferring the heated pellets to the thermoforming station, and the bottom heater means co-operating with a support for the pellets while said conveyor elements are being driven through the heating station.

2. An installation according to claim 1, wherein the bottom heater means comprise a bottom heater plate constituting a support for the pellets while the conveyor elements are being driven through the heating station.

3. An installation according to claim 2, including a cold support plate which is disposed on one side of the bottom heater plate, and which has a surface that extends in the same horizontal plane as a surface of said heater plate, the bottom heater plate and the cold support plate being mounted to move sideways between a first position in which the bottom heater plate is suitable for supporting the pellets and a second position in which the cold support plate is suitable for supporting the pellets.

4. An installation according to claim 3, including a cold top plate which is disposed above the cold support plate, wherein said cold top plate and the top heater means are mounted to move sideways between a first position in which the top heater means are situated above the pellets and a second position in which the cold top plate is situated above the pellets.

5. An installation according to claim 1, wherein the top heater means comprise a top heater plate that presents a bottom surface suitable for being in contact with the top faces of the pellets.

6. An installation according to claim 1, including a bottom belt made of a heat-conducting material, and means for transmitting heat generated by the bottom heater means to said belt, the bottom belt constituting a support for the pellets which rest on a top surface of said belt, and the bottom belt being driven through the heating station in a manner synchronized with the conveyor elements.

7. An installation according to claim 6, wherein the bottom heater means comprise a bottom heater plate, that presents a top surface in thermal contact with the bottom surface of the belt, and wherein the bottom belt constitutes a support for the pellets which rest on a top surface of said belt.

8. An installation according to claim 6, including a top belt made of a heat-conducting material, and means for transmitting the heat generated by the top heater means to said belt, a bottom surface of said belt being suitable for being in contact with the top faces of the pellets, and the top belt being driven through the heating station in a manner such that said belt is synchronized with the conveyor elements.

9. An installation according to claim 7, including a top belt made of a heat-conducting material, and means for transmitting the heat generated by the top heater means to said belt, a bottom surface of said belt being suitable for being in contact with the top faces of the pellets, and the top belt being driven through the heating station in a manner such that said belt is synchronized with the conveyor elements.

10. An installation according to claim 8, wherein the top heater means comprise a top heater plate that presents a bottom surface in thermal contact with a top surface of said belt.

11. An installation according to claim 9, wherein the top heater means comprise a top heater plate that presents a bottom surface in thermal contact with a top surface of said belt.

12. An installation according to claim 1, wherein the conveyor elements are constituted by conveyor slats presenting a thickness at the most substantially equal to a thickness of the pellets before said pellets are thermoformed.

13. An installation according to claim 8, wherein the conveyor elements are constituted by conveyor slats presenting a thickness at the most substantially equal to a thickness of the pellets before said pellets are thermoformed and wherein said installation further includes means for pressing the pellets via the belts.

14. An installation according to claim 9, wherein the conveyor elements are constituted by conveyor slats presenting a thickness at the most substantially equal to a thickness of the pellets before said pellets are thermoformed and wherein said installation further includes means for pressing the pellets via the belts.

15. An installation according to claim 13, wherein the heater plates press the pellets via the belts.

16. An installation according to claim 15, wherein the heater plates press the pellets via the belts.

17. An installation according to claim 6, including support rods for supporting the bottom belt, which rods are disposed under said bottom belt.

18. An installation according to claim 17, wherein the bottom heater means comprise a bottom heater plate which, in a top face thereof, is provided with grooves suitable for receiving the support rods.

19. An installation according to claim 1, wherein the conveyor elements are constituted by conveyor slats, each cell being defined between an upstream conveyor slat and a downstream conveyor slat disposed in succession in a direction in which the pellets are conveyed.

20. An installation according to claim 19, wherein the outline of each conveyor slat is provided with a downstream concave edge and with an upstream concave edge that are mutually aligned in the conveying direction in which the pellets are conveyed, a downstream concave edge of a first slat being suitable for defining a cell with an upstream concave edge of a second slat disposed downstream from said first slat.

21. An installation according to claim 20, including means for disposing the pellets in a stack on an inlet table whose surface extends in the same horizontal plane as a top surface of the support for the pellets, wherein the conveyor means include means for bringing a conveyor slat onto the inlet table in a waiting position, said waiting position being a position in which the downstream concave edge of said slat is situated facing the stack, and drive means for moving said slat downstream so that said concave edge co-operates with the bottom pellet in the stack to drive said pellet downstream, at least until said slat comes into an intermediate position in which the upstream concave edge of said slat is situated in front of the stack.

22. An installation according to claim 21, wherein the drive means comprise a drive member that moves in reciprocating manner between a first position in which said drive member is suitable for co-operating with a slat in the waiting position and a second position in which said drive member places said slat in the intermediate position thereof, and wherein, when a slat reaches the intermediate position thereof, said slat pushes the slats disposed in front of it downstream.

23. An installation according to claim 1, comprising means for depositing pellets in locations of cells defined by conveyor elements on the top surface of an inlet support, during a stop stage, in an upstream region of the heating station.

24. An installation according to claim 1, including rails suitable for supporting the slats by holding them out of contact with the heater plates.

25. An installation according to claim 1, wherein the conveyor elements are constituted by conveyor slats presenting a thickness at the most substantially equal to a thickness of the pellets before said pellets are thermoformed and wherein said installation includes belts to which side ends of the slats are fixed, and which drive the slats through the heating station.

26. An installation according to claim 1, wherein the means for transferring the heated pellets to the thermoforming station comprise a pick-up member, disposed downstream from the heating station and suitable for picking up a pellet that is situated in a cell.

27. An installation according to claim 19, wherein the pellet that is picked up is situated between a downstream conveyor slat and an upstream conveyor slat, and wherein the installation includes means for moving the downstream conveyor slat away from the upstream conveyor slat before said member picks up the pellet.

28. An installation according to claim 1, including a shaping device disposed downstream from the heating station and suitable for co-operating with the peripheries of the pellets before they are thermoformed.

29. An installation according to claim 28, wherein the shaping device comprises a support edge and a shaping clamp having two arms suitable for being opened when a pellet is put in place on the support edge, and for being closed again to define between them a shaping outline for the pellet.

30. An installation according to claim 29, wherein the support edge forms a die-stamping edge, and wherein the shaping device further comprises a die stamp suitable for co-operating with the die-stamping edge for die-stamping a peripheral region of a pellet while said peripheral region is held captive in the shaping device.

31. An installation according to claim 28, wherein the shaping device is disposed in the thermoforming station.

* * * * *